No. 841,401. PATENTED JAN. 15, 1907.
P. J. HOPE.
DISTILLING APPARATUS.
APPLICATION FILED MAY 4, 1903. RENEWED OCT. 23, 1906.
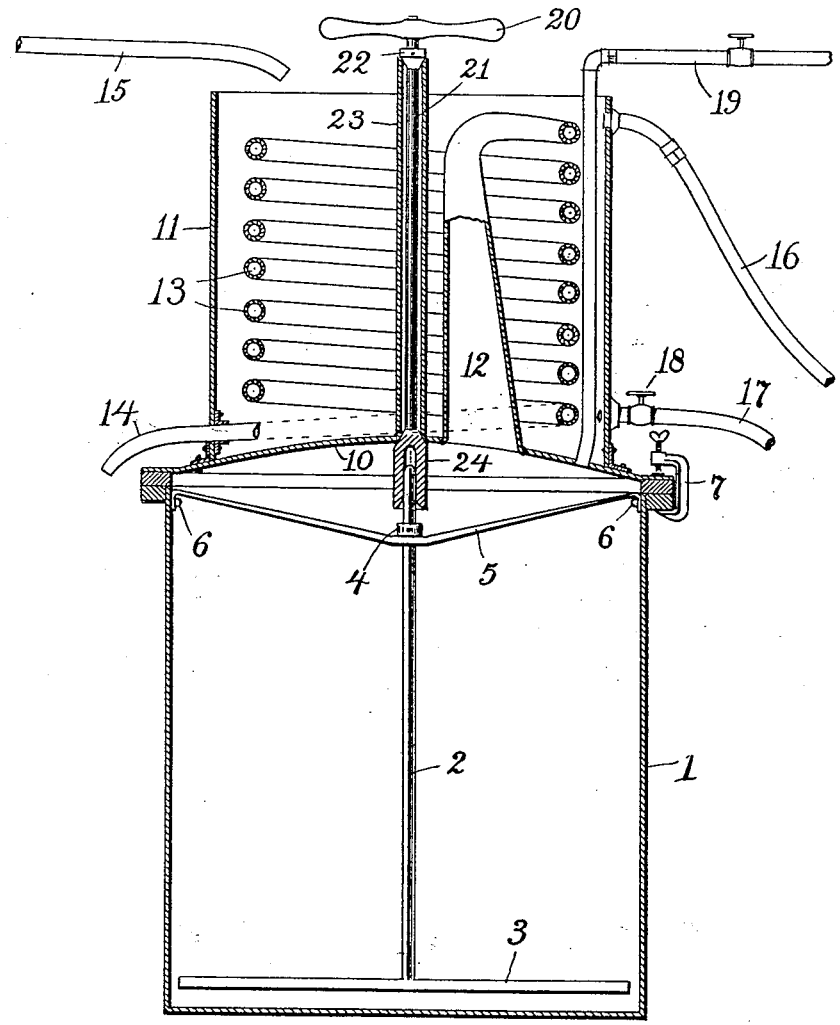
Witnesses;
Geo. F. Stiles
E. H. Waite
Inventor,
Phillip J. Hope;
By A. B. Upham,
his Attorney.
THE NORRIS PETERS CO., WASHINGTON, D. C.

UNITED STATES PATENT OFFICE.

PHILLIP J. HOPE, OF EVERETT, MASSACHUSETTS.

DISTILLING APPARATUS.

No. 841,401.　　　　Specification of Letters Patent.　　　　Patented Jan. 15, 1907.

Application filed May 4, 1903. Renewed October 23, 1906. Serial No. 340,186.

*To all whom it may concern:*

Be it known that I, PHILLIP J. HOPE, a citizen of the United States, and a resident of Everett, in the county of Middlesex, State of Massachusetts, have invented certain new and useful Improvements in Distilling Apparatus, of which the following is a full, clear, and exact description.

The object of my invention is the construction of an improved apparatus to be used in the manufacture of varnishes, the primary object thereof being to prevent the loss of the hydrocarbons and volatile ingredients of the varnish.

Referring to the drawing, forming part of this specification, and which shows the complete apparatus in a central sectional elevation, the reference-numeral 1 designates the varnish-pot, and 10 the cover thereof designed to be tightly secured thereon by suitable clamps 7. Secured upon this cover is the cylinder 11, of which said cover constitutes a bottom, and both form a water-tank. Within this tank is a coil 13, whose upper section is joined to the upright vapor-discharge 12 and whose lower section terminates in the tail 14 outside the water-tank. Flowing water is received into this tank from any suitable source, as a pipe 15, held above it, while the water overflows through the overflow-pipe 16 at the upper edge of the tank. A pipe 17, normally closed by a cock 18, enables all the water to be drawn from the tank when desired. This combined cover and still having been clamped upon the pot 1, the vapors arising from the contents escape through the discharge 12 and passing therefrom through the coil or worm 13 are condensed by the surrounding water and drip from the worm-tail 14 into any suitable receptacle.

Within the pot 1 I locate the stirrer, consisting of the vertical shaft 2 and stirrer-arms 3, the same being revolubly supported by means of the collar 4 and the metal cross-strap 5, whose ends are detachably held by the pins 6, projecting from within the pot. Said strap is of course suitably apertured to permit the shaft 2 to pass through it and said collar to rest upon the strap.

Within the tube 23, which is rigidly held by the cover 10, is the rod 21, having turning handle 20 at its upper end and a socket 24 at its lower end. This socket fits loosely the upper end of the shaft 2 and both are made rectangular or prismatic in order that the rotation of the rod shall turn the said shaft with it. Moreover, this socket is made deep enough so that in case the stirrer-arms 3 are forced to rise over a hummock or other hard accumulation of varnish the end of said shaft has ample play to ascend in said socket while still being made to turn therewith.

The upper end of the socket 24 and the under face of the collar 22 at the upper end of the tube 23 are each made conical in order to close the said tube and prevent the escape of vapor through it.

After the mixing operation is complete the combined cover and still are raised from the pot and swung to one side by any suitable block and tackle, the socket 24 releasing the shaft 2 as the parts are raised. In the same manner as the cover and still are returned to their position over the pot and lowered down thereon the socket 24 receives the shaft end with certainty, and after the rims have come together the clamps 7 are applied and the cover made fast.

Although it is customary to remove the tank or pot to the reducing-room before adding the hydrocarbon, my apparatus enables me to do the entire work without removing the apparatus from the fire. This is possible, for the reason that there are no explosive vapors thrown off into the air, but the condensed hydrocarbon passes off from the worm through a suitable pipe to a place of safety, and the turpentine or other hydrocarbon used is fed to the mixture in the pot through a pipe 19 from a distant reservoir. Thus at no instant is there any exposed inflammable liquid or explosive vapors in danger from the fire which is heating the mixture. On this account I am enabled to work with far better efficiency with my apparatus than in the former methods, since the point to be guarded against in the old manner of working lay in the mixture becoming too cool before the proper treatment had been effected. Now, however, I can keep the mixture up to the right temperature until the work is entirely finished and the completed varnish ready to be pumped up to the receiving-tanks in the other part of the establishment. Another great gain accomplished by my apparatus consists in the freedom given to the workmen from the suffocating fumes or vapors rising from the hot hydrocarbon. Not only are they practically blinded by the vapor—especially when turpentine is the hydrocarbon used— but the men are often made fairly drunk by the same, and so are incapacitated from properly looking after the work. Hence it often happens that the varnish is absolutely ruined from this cause alone.

What I claim as my invention, and for which I desire Letters Patent, is as follows, to wit:

The combination with a varnish-kettle, of a cover removably secured thereto, a cylindrical shell fixed water-tight at its lower edge to the upper surface of said cover, means for admitting water thereto and removing it therefrom, a tube fixed water-tight to said cover and rising centrally within said cylindrical shell, a shaft permanently but rotatably located in said tube and having a turning handle at its upper end and a clutch member at its lower end within said kettle, stirrers rotatably supported in said kettle and engaged by said clutch member, a worm located in said cylindrical shell concentric with said tube and communicating at its upper end with the interior of said kettle through said cover and at its lower end radially through said shell, and a pipe for the introduction of hydrocarbons through said cover into said kettle; said pipe having means for its closure.

In testimony that I claim the foregoing invention I have hereunto set my hand this 2d day of May, 1903.

PHILLIP J. HOPE.

Witnesses:
A. B. UPHAM,
HENRY W. LOWDING.